(No Model.)
A. BROHMANN.
ROAD CART.
No. 536,776. Patented Apr. 2, 1895.
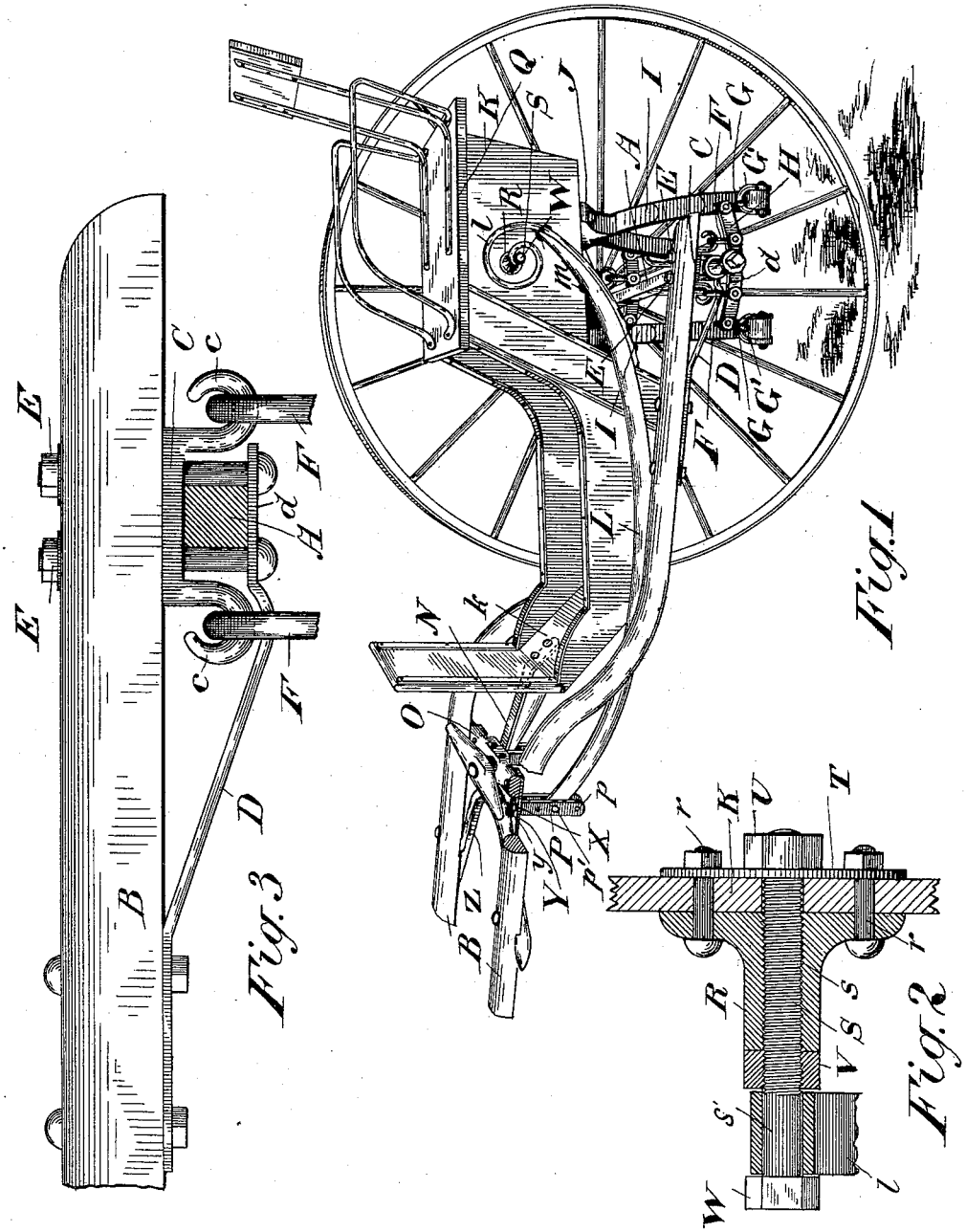
Witnesses
Fred Clarke
A. M. Neff
Inventor
Aloysius Brohmann
by
Ridout & Maybee
Attys

UNITED STATES PATENT OFFICE.

ALOYSIUS BROHMANN, OF MILDMAY, CANADA.

ROAD-CART.

SPECIFICATION forming part of Letters Patent No. 536,776, dated April 2, 1895.

Application filed September 7, 1894. Serial No. 522,350. (No model.) Patented in Canada April 4, 1894, No. 45,694.

*To all whom it may concern:*

Be it known that I, ALOYSIUS BROHMANN, of the village of Mildmay, in the county of Bruce and Province of Ontario, Canada, have invented certain new and useful Improvements in Road-Carts, of which the following is a specification, and for which I have received Letters Patent in Canada, dated April 4, 1894, No. 45,694.
The object of the invention is to produce a two-wheeled vehicle or cart which will do away with horse motion, as well as any sudden shock either to the horse or the person on the seat when the wheel strikes a stone or other obstacle, as well as take undue weight off the horse when ascending or descending a hill; and it consists essentially, in supporting the body of the vehicle on springs which are attached to clevises pivotally attached to either ends of bars, which latter are also supported by clevises pivotally connected with the shafts so that these bars which carry the springs may be free to swing in unison with the horse motion, or when any jolt occurs. The front of the body is attached to the cross-bar of the shaft, and side bars connected by springs with the body of the vehicle, as well as adjustably connected with the shafts, keep the center of gravity over the axle and swinging clevises which support the main springs, as hereinafter more particularly set out.

Figure 1, is a perspective side view of my improved cart with the near wheel removed and part of the near shaft broken away. Fig. 2, is a detail of the bracket to which the coil spring on the side bar is attached. Fig. 3, is a detail of the hooked iron plate which carries the clevises, showing its mode of attachment.

Like letters of reference indicate similar parts in the various figures.

In Fig. 1, A, is the axle of a two-wheeled vehicle, and B, are the shafts. C, is an iron plate provided with hooks c, which rests on the axle A, and is between the shafts and the axle. E, E, are bolts which pass through the shafts, the iron plate and pass on either side of the axle through the clip d, which is formed on the brace D, which latter is bolted to the shaft, as indicated. Fig. 3, is a large detail of these parts showing the heads of the bolts E, below the clip d, and the nuts on top of the shaft, as the preferable mode of attachment.

F, F, are clevises pivotally attached to the swinging bar H. These clevises rest on the hooks c, c. G', G', are also clevises pivotally connected to either end of the swinging bar H. These clevises carry other clevises G, G, set at right angles thereto, the bolts of which pass through the ends and support the elliptical springs I, I. These springs I, I, are supported by a similar arrangement on the far side of the cart, as indicated in the drawings. It will thus be seen that the main weight of the body of the vehicle and of the person sitting on the seat, is supported by the springs which are pivotally attached to the swinging bars H.

J, is the wooden bolster bolted to the bottom of the body of the vehicle and to the springs in the usual manner.

k, is the foot rest of the body of the vehicle, which is connected by the strap N, to the center of the cross bar O, of the shafts B. This strap N, holds up the forward part of the vehicle when a person steps therein, and before he is seated on the seat. The usual step for a cart is not shown, as it is attached to that part of the shaft which is broken away in the drawings.

L, is a side bar and l, a coil-spring which is bolted at m, to the rear end thereof and attached by means of the bracket R, and the bolt S, to the body of the side of the vehicle. The bolt head W, is shown in Fig. 1. The forward end of the side bar is adjustably attached to a holder P, which is a piece of metal of inverted U-form, and which is secured to the strap Y, which is bolted to the cross-bars O, and the semi-circular brace Z, of the shafts. This strap Y, is provided with the slot y, and the clamping bolt X, which securely fastens the holder in place in the slot. The holder may thus be moved backward and forward so as to adjust the strain on the coil-spring l, as occasion may require. The forward end of the side bar L, is also secured to the holder by means of the bolt p', which passes through one of the holes p, in the holder. The forward end of the side bars may thus be raised or lowered as may be required to suit the height of the horse.

When a person is seated in the vehicle, the head W, of the bolt S, should, on a level road, be approximately on the same horizontal plane as the small bolt *p'*.

The whole of the side bar L, may be made of one piece of metal, the ends being formed in the coil-spring, as shown, and the central portion being thicker and more or less of a spring nature.

Fig. 2, is an enlarged detail of the bracket or strut R, and the mode of attaching the end of the coil-spring. This bracket R, is bolted to the sides of the vehicle K, by the bolts *r*, provided with nuts which rest on the washer T. This bracket is formed with a central threaded hole to receive the threaded end *s*, of the bolt S. This bolt is only threaded for about two-thirds of its length, the outer end being a smooth shank which secures in place the end of the coil-spring *l*.

V, is an adjusting nut attached to the coil-spring *l*, and which may be tightened or loosened so as to allow the spring sufficient play between the head of the bolt W, and this nut V.

U, is the nut of the main bolt S, which rests on the washer T.

From the foregoing construction, it may be seen that the elliptical springs I, are borne by the clevises G, which are pivotally attached to the ends of the swinging bars H, and which uphold the principal weight of the vehicle and of the person seated therein, in such a manner that the weight of the sitter is maintained immediately over the axle under all circumstances, the swinging bars H, swinging in unison with the horse motion or swinging when any obstacle to the front or to the side is encountered, thereby overcoming horse motion by allowing the front part of the shafts to move up and down while the body of the vehicle remains nearly horizontal, and thereby also overcoming the side motion when the wheel runs over any obstacle by allowing the swinging bars H, which support the springs, to swing sidewise. The coil-spring *l*, on the side bars L, which is attached to the side of the vehicle K, also does away with any sudden shock either to the horse or to the person on the seat, as well as relieves the vehicle from any strain which it would receive if they were not attached, and they also serve to keep the center of gravity over the clevises G, G, and the axle A. These side bars are of course located one on each side of the vehicle. It will also be seen that in descending a hill, the pressure of the front is on the foot rest *k*, and that this pressure is exerted lengthwise of the side bars L, and the shafts B, and in ascending a hill that the pull would be directly lengthwise of the shafts, thus relieving the horse either in going up or down a hill from undue strain either by the tendency to lift or lower the shafts.

What I claim as my invention is—

1. In a vehicle or cart, the combination of the body of the vehicle, an axle and shafts therefor, a bar H on each side of the vehicle swinging beneath said axle and having a pivotal connection with said shafts on each side of and in juxtaposition to said axle, and a spring on each side of said axle connecting each end of said bar H with the body of the vehicle, thereby forming a double equalizing connection between said swinging bar H and said body, substantially as described.

2. In a vehicle or cart, the body of the vehicle, in combination with springs pivotally attached to bars adapted to swing beneath the axle, the bars being pivotally connected with the shafts and suspended therefrom by suitable means, on either side of and in juxtaposition to the axle, and spring side bars adjustably connected at their forward ends to the shafts and at their rear ends to the seats of the vehicle, substantially as described and for the purpose specified.

3. In a vehicle or cart, the body of the vehicle, in combination with springs pivotally attached to bars adapted to swing beneath the axle, the bars being pivotally connected with the shafts and suspended therefrom by suitable means on either side and in juxtaposition to the axle, spring side bars adjustably connected at one end to the shafts and at the other to the side of the vehicle, and a strap connecting the cross-bar of the shaft to the foot-rest of the vehicle, substantially as described and for the purpose specified.

4. In a vehicle or cart, the combination with the body K, of the side bar L, coil-spring *l*; holder P, provided with adjusting holes *p*, and bolt *p'*; strap Y, provided with slot *y*, and clamping bolt X; cross-bar O, and semi-circular shaft brace Z, substantially as described and for the purpose specified.

5. In a vehicle or cart, the shaft B, in combination with iron plate C, provided with hooks *c*; the bolts E, E; axle A; clip *d*, and brace D, substantially as described and for the purpose specified.

6. In a vehicle or cart, the hooked iron plates C, resting on the axle A, and rigidly attached to the shafts B, in combination with clevises F, F; clevises G', G'; clevises G, G; swinging bars H, and elliptical springs I, I, connected to the body of the vehicle K, substantially as described and for the purpose specified.

7. In a vehicle or cart, the hooked iron plates C, resting on the axle A, and rigidly attached to the shafts B, by bolts E, E, which pass on either side of the axle through the clip plates *d*; in combination with clevises F, F; clevises G', G'; clevises G, G; swinging bars H; elliptical springs I, I, connected to the body of the vehicle K, by the bolsters J, and the strap N, connecting the foot rest *k*, with the cross-bar O, substantially as described and for the purpose specified.

8. In a vehicle or cart, the combination with the side of the vehicle K, of the bracket R; bolts *r, r*; washer T; bolt S; provided with head W; shank *s'*, and thread *s*; the nut U, adjusting nut V, and the coil-spring *l*, substantially as described and for the purpose specified.

9. A vehicle or cart, comprising the following elements shafts B; cross-bar O; semi-circular brace Z; strap Y, provided with slot $y$, and clamping bolt X; holders P; adjustable side bars L; coil-springs $l$; body K; brackets R; bolts S; strap N; bolsters J; elliptical springs I, I; clevises G, G; clevises G', G'; swinging bars H; clevises F, F; iron plates C, provided with hooks $c$; bolts E, E; axle A; clip $d$, and brace D, substantially as described and for the purpose specified.

City of Toronto, September 3, 1894.

ALOYSIUS BROHMANN.

In presence of—
 FRED CLARKE,
 A. M. NEFF.